United States Patent [19]
Shimizu et al.

[11] Patent Number: 5,970,950
[45] Date of Patent: Oct. 26, 1999

[54] CONTROL METHOD AND CONTROL APPARATUS OF DIRECT INJECTION GASOLINE ENGINE

[75] Inventors: Hirokazu Shimizu; Hajime Hosoya, both of Atsugi; Hiraku Ohba, Yokohama; Yuki Nakajima, Yokohama; Takamasa Ueda, Yokohama, all of Japan

[73] Assignee: Unisia Jecs Corporation, Atsugi, Japan

[21] Appl. No.: 09/106,341

[22] Filed: Jun. 29, 1998

[30] Foreign Application Priority Data

Jun. 30, 1997 [JP] Japan ................................ 9-173945

[51] Int. Cl.$^6$ .................................................. F02B 17/00
[52] U.S. Cl. ......................... 123/295; 123/305; 123/486
[58] Field of Search .................................. 123/295, 305, 123/486, 478, 299

[56] References Cited

U.S. PATENT DOCUMENTS

| | | | |
|---|---|---|---|
| 4,955,339 | 9/1990 | Sasaki et al. | 123/295 |
| 5,191,531 | 3/1993 | Kurosu et al. | 123/295 |
| 5,617,836 | 4/1997 | Cullen et al. | 123/486 |
| 5,638,790 | 6/1997 | Minowa et al. | 123/486 |
| 5,785,031 | 7/1998 | Akimoto | 123/305 |

FOREIGN PATENT DOCUMENTS 5-71383   3/1993   Japan .

*Primary Examiner*—John Kwon
*Attorney, Agent, or Firm*—Foley & Lardner

[57] ABSTRACT

In the control method and apparatus of a direct injection gasoline engine, as for the uniform charge combustion mode performing only the intake stroke injection and the stratified charge combustion mode performing only the compression stroke injection, the injection timing is determined by referring to the injection timing map set for each mode. On the other hand, in the double injection mode performing the intake stroke injection and the compression stroke injection, the injection timing map for the intake stroke injection and the injection timing map for the compression stroke injection are both equipped, and the injection timing in the intake stroke injection is determined by the fuel quantity being injected by the intake stroke, and the injection timing in the compression stroke injection is determined by the fuel quantity being injected by the compression stroke.

16 Claims, 6 Drawing Sheets

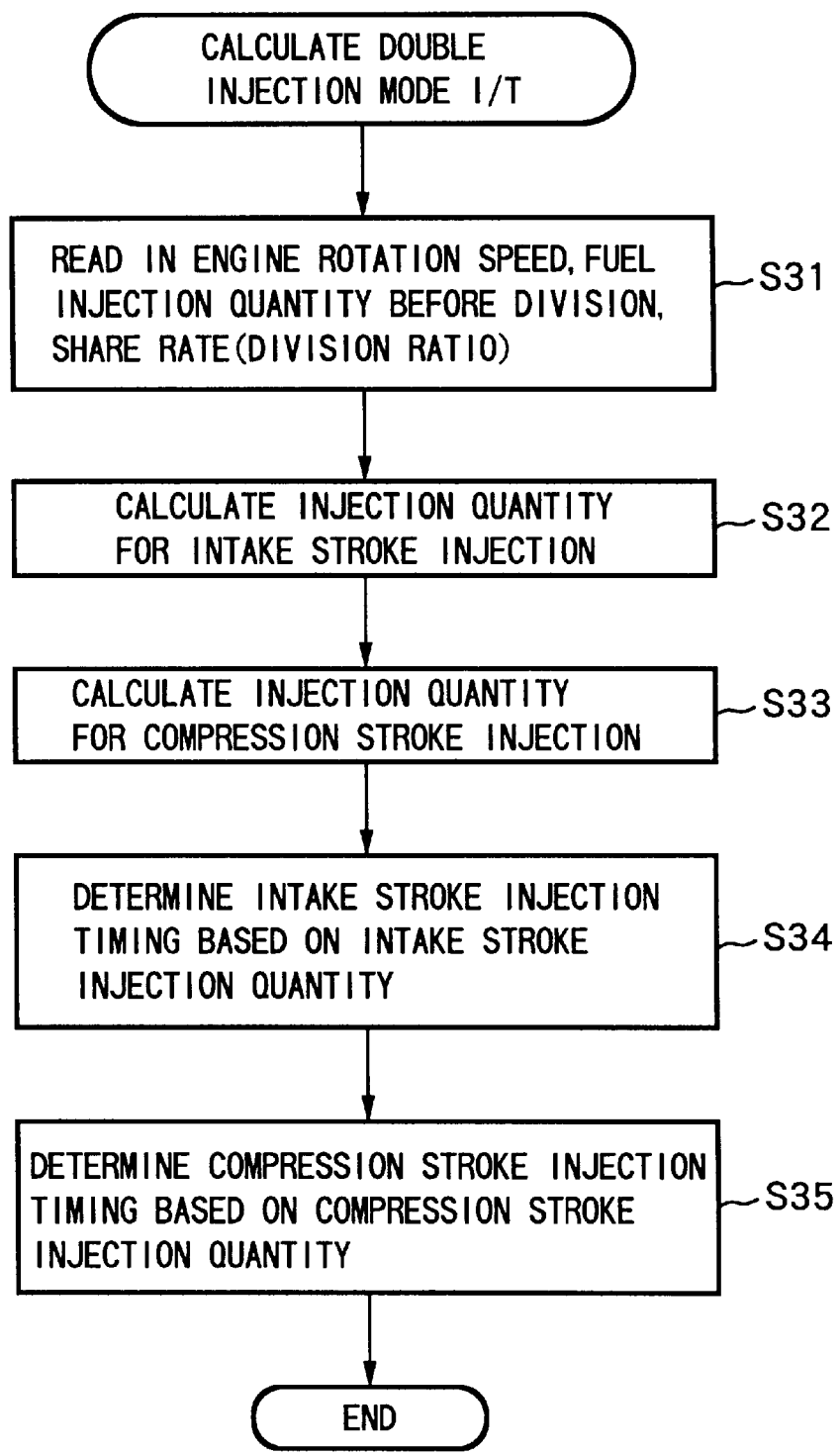

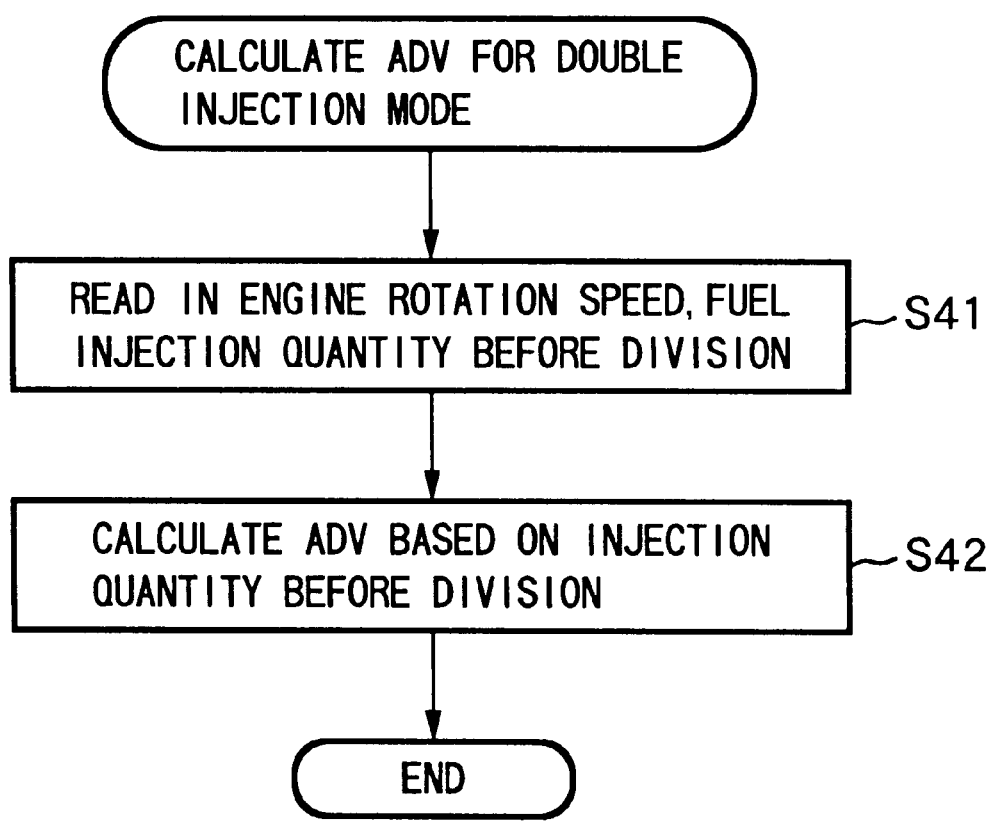

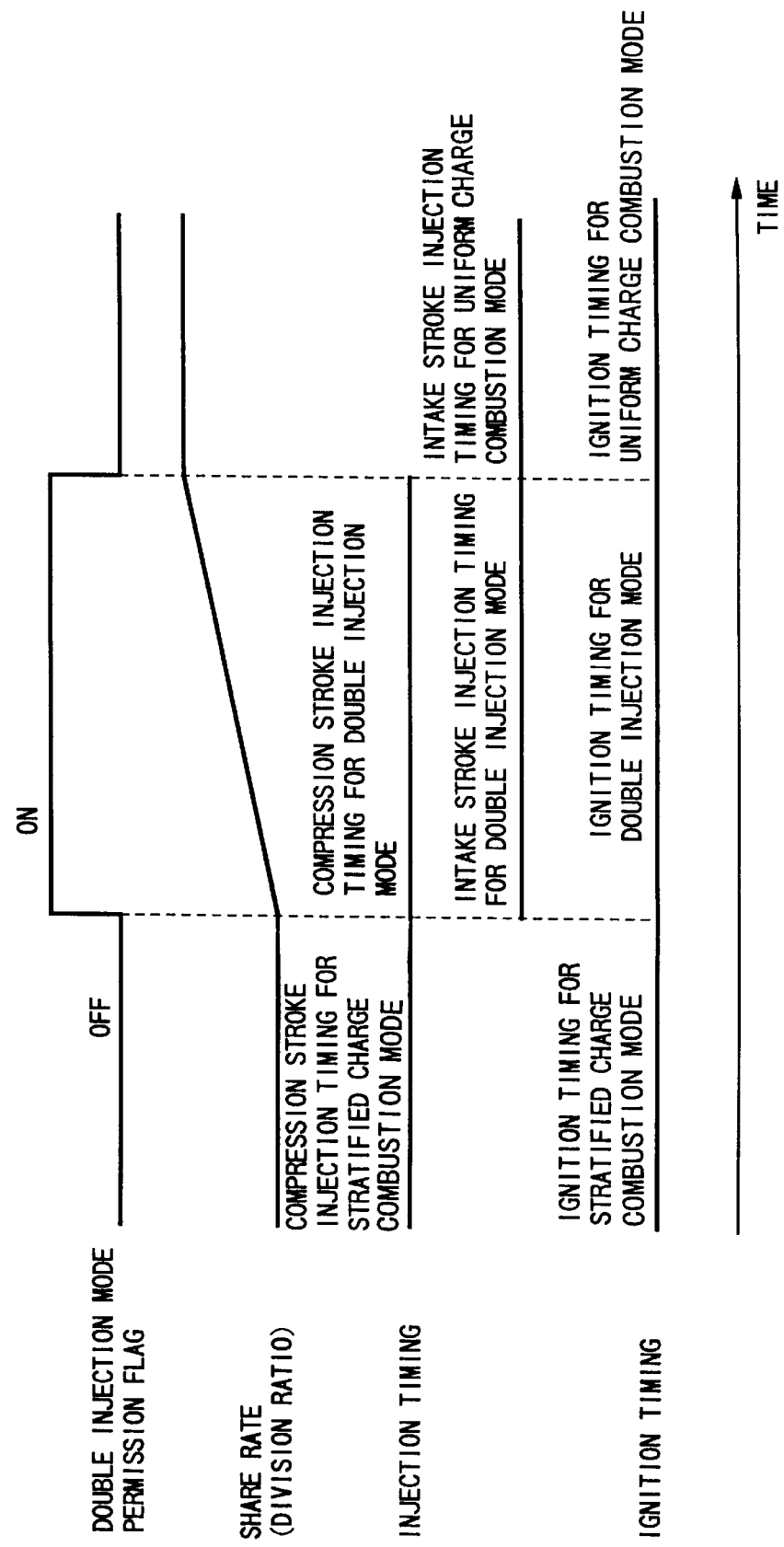

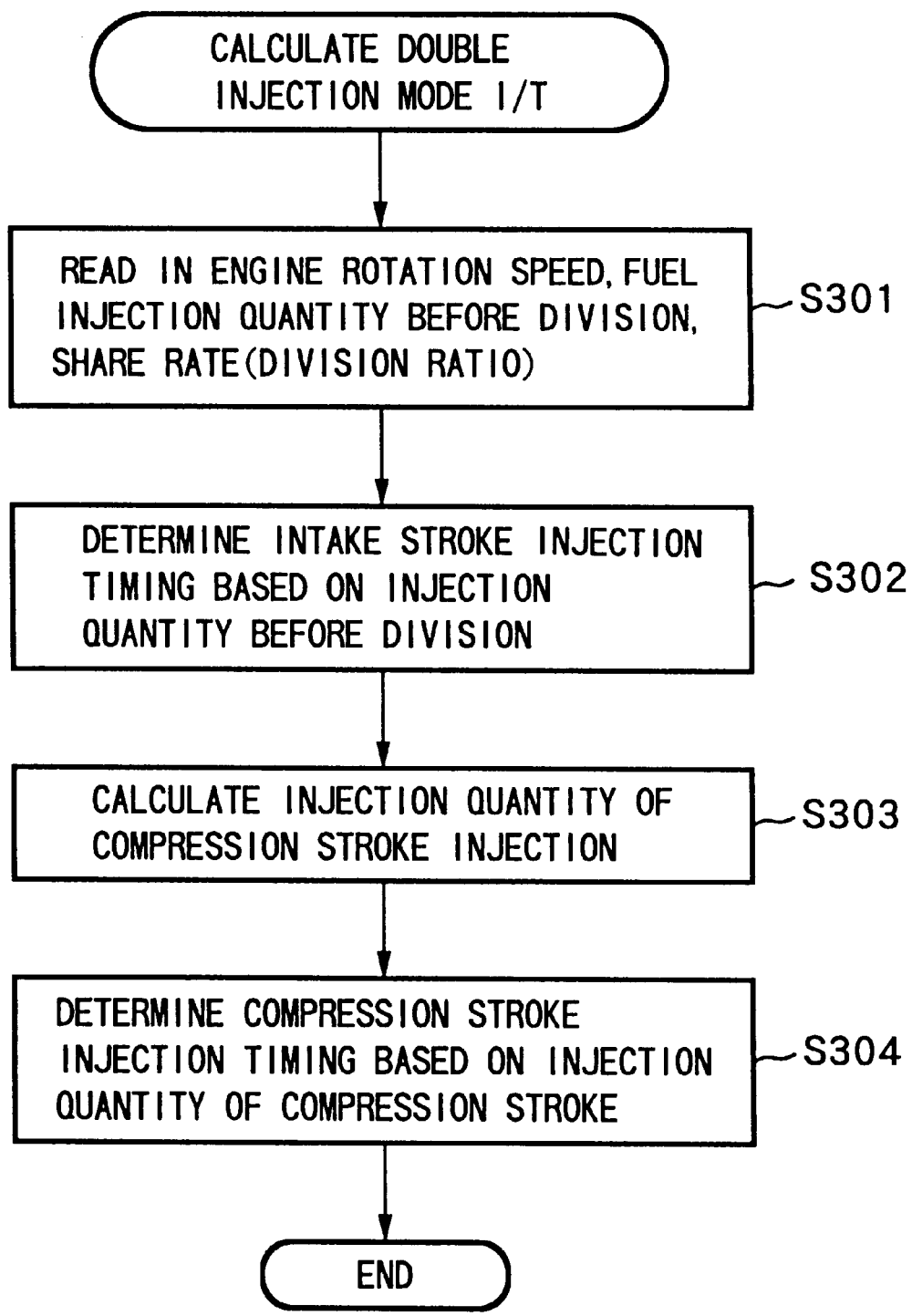

CONTROL METHOD AND CONTROL APPARATUS OF DIRECT INJECTION GASOLINE ENGINE

BACKGROUND OF THE INVENTION (1) Field of the Invention

The present invention relates to a control method and a control apparatus of a direct injection gasoline engine, and more specifically, to a control technique of the injection timing and ignition timing in a direct injection gasoline engine comprising a fuel injection valve for directly injecting fuel into a cylinder.

(2) Related Art of the Invention

Conventionally, a direct injection gasoline engine comprising a fuel injection valve for directly injecting fuel into a cylinder is known comprising a stratified charge combustion mode for performing a stratified charge combustion by carrying out fuel injection only in a compression stroke, a uniform charge combustion mode for performing a uniform charge combustion by carrying out fuel injection only in an intake stroke, and a double injection mode for performing a fuel injection in the intake stroke and a fuel injection in the compression stroke during one cycle, wherein either one of the stratified charge combustion mode or the uniform charge combustion mode is selected in correspondence to the driving condition, and on the other hand, the double injection mode is carried out during the switching time between the stratified charge combustion mode and the uniform charge combustion mode (refer to Japanese Unexamined Patent Publication No.5-071383).

Obviously, the requested injection timing differs between the stratified charge combustion mode and the uniform charge combustion mode, and the appropriate ignition timing also differs. Therefore, in the prior art, the injection timing was set for each of the combustion modes, and the ignition timing was set with different properties for each of the combustion modes.

When the intake stroke injection was performed in the double injection mode, it was controlled according to the injection timing and the ignition timing of the uniform charge combustion mode, and when the compression stroke injection was performed in the double injection mode, it was controlled according to the injection timing and the ignition timing of the stratified charge combustion mode.

However, experiments showed that it was not always possible to gain a high combustion stability with the conventional structure where the injection timing and the ignition timing according to the uniform charge combustion mode or the stratified charge combustion mode were utilized as it is for the injection timing and the ignition timing of the double injection mode.

SUMMARY OF THE INVENTION

Therefore, the present invention aims at providing a direct injection gasoline engine in which a high combustion stability is obtained by improving the control of the ignition timing and the injection timing during the double injection mode.

Further, the present invention aims at improving the control accuracy of the injection timing during the double injection mode with a simple system structure.

The control method and apparatus of the direct injection gasoline engine for achieving the above objects according to the present invention comprises individually an injection timing map for a stratified charge combustion mode, an injection timing map for a uniform charge combustion mode, an injection timing map for an intake stroke injection in a double injection mode, and an injection timing map for a compression stroke injection in the double injection mode, wherein these injection timing maps are referred to in order to control the injection timing in the corresponding fuel injection.

According to such a construction, even for the same intake stroke injection, the intake stroke injection in the double injection mode and the intake stroke injection in the uniform charge combustion mode each search for their injection timing from different injection timing maps. Similarly, for the same compression stroke injection, the compression stroke injection during the double injection mode and the compression stroke injection during stratified charge combustion mode search for their injection timing from different injection timing maps. Therefore, the fuel injection can be performed by the optimum timing for each mode.

Further, the injection timing maps may be formed to store the injection timing in correspondence to a fuel injection quantity and an engine rotation speed, and when searching the injection timing map in the double injection mode, the injection timing can be searched from the injection timing map for the intake stroke injection based on the fuel quantity being injected by the intake stroke injection, and it can also be searched from the injection timing map for the compression stroke injection based on the fuel quantity being injected in the compression stroke.

According to such a construction disclosed above, in the double injection mode performing the fuel injection by the intake stroke and the fuel injection by the compression stroke in one cycle, the sum of the fuel injected by the intake stroke and the fuel injected by the compression stroke becomes the fuel quantity in that cycle. However, the injection timing would not be searched according to the sum of the fuel quantity, but rather, the injection timing for the intake stroke injection is determined based on the fuel quantity being injected during the intake stroke, and the injection timing for the compression stroke injection is determined based on the fuel quantity being injected during the compression stroke.

Therefore, in the case where a ratio between the fuel injection quantity in the intake stroke and the fuel injection quantity in the compression stroke is gradually changed in the double injection mode, the injection timing for the intake stroke injection and that for the compression stroke injection can be changed in response to the change in the ratio, even if the total amount of the fuel injection quantity during one cycle is the same.

Another possible system may be formed to individually comprise an injection timing map for the stratified charge combustion mode, an injection timing map for the uniform charge combustion mode, and an injection timing map for the compression stroke injection in the double injection mode, wherein each of the corresponding maps are referred to in order to determine the injection timing in the compression stroke injection of the double injection mode, the stratified charge combustion mode, or the uniform charge combustion mode, and as for the intake stroke injection of the double injection mode, the injection timing is searched from the injection timing map for the uniform charge combustion mode.

According to such a construction, the injection timing for the intake stroke injection in the double injection mode does not provide a great influence to the combustibility compared to that of the compression stroke injection. Therefore, the injection timing map corresponding to the intake stroke injection of the double injection mode is not equipped to the system, and instead, the injection timing map corresponding to the uniform charge combustion mode for performing the same intake stroke injection is referred to in order to determine the injection timing. Thus the number of the injection timing maps to be stored is reduced, and therefore, the system structure can be simplified.

Further, the injection timing map may be formed so as to store the injection timing in correspondence to the fuel injection quantity and the engine rotation speed, and as for the intake stroke injection of the double injection mode, the injection timing is searched from the injection timing map for the uniform charge combustion mode based on the total quantity of the fuel being injected by the intake stroke injection and the combustion stroke injection, and on the other hand, as for the compression stroke injection of the double injection mode, the injection timing is searched from the injection timing map for the compression stroke injection based on the fuel quantity being injected by the compression stroke.

According to such a construction, the injection timing for the compression stroke injection of the double injection mode is searched from the injection timing map corresponding to the compression stroke injection based on the fuel quantity being injected during the compression stroke. On the other hand, the injection timing for the intake stroke injection of the double injection mode can be determined by using the injection timing map as it is corresponding to the uniform charge combustion mode performing only the intake stroke injection, by referring to the injection timing map for the uniform charge combustion mode based on the total quantity.

Further, in the construction where the injection timing is determined as disclosed above, it is effective to further provide an ignition timing map for the stratified charge combustion mode, an ignition timing map for the uniform charge combustion mode, and an ignition timing map for the double injection mode, controlling the ignition timing by searching the ignition timing from the corresponding map out of the ignition timing maps for each mode.

According to such a construction, as for the double injection mode performing both the compression stroke injection and the intake stroke injection, the ignition timing that is most suited for the double injection mode, which differs from either the ignition timing for the stratified charge combustion mode or the ignition timing for the uniform charge combustion mode, can be set.

Further, the ignition timing map can be formed so as to store the ignition timing corresponding to the fuel injection quantity and the engine rotation speed, and during the double injection mode, the ignition timing can be searched from the ignition timing map for the double injection mode based on the total quantity of the fuel being injected by the intake stroke injection and the compression stroke injection.

According to such a construction, in the double injection mode performing both the intake stroke injection and the compression stroke injection, the total quantity of the fuel used for both the intake stroke injection and the compression stroke injection corresponds to an engine load. Therefore, the ignition timing is determined from the total quantity.

These and other objects and phases of the present invention would become apparent from the following explanation on the embodiments regarding the drawings accompanied herewith.

BRIEF DESCRIPTION OF THE DRAWINGS

FIG. 3 is a flowchart showing the routine for determining the injection timing in the double injection mode;

FIG. 4 is a flowchart showing the routine for determining the ignition timing of the double injection mode;

FIG. 5 is a time chart showing the correlation between the determination on the injection timing and the ignition timing, and the mode switching according to the present invention; and FIG. 6 is a flowchart showing the routine for determining the injection timing in the double injection mode.

DETAILED DESCRIPTION OF THE PREFERRED EMBODIMENTS

Figure 1:
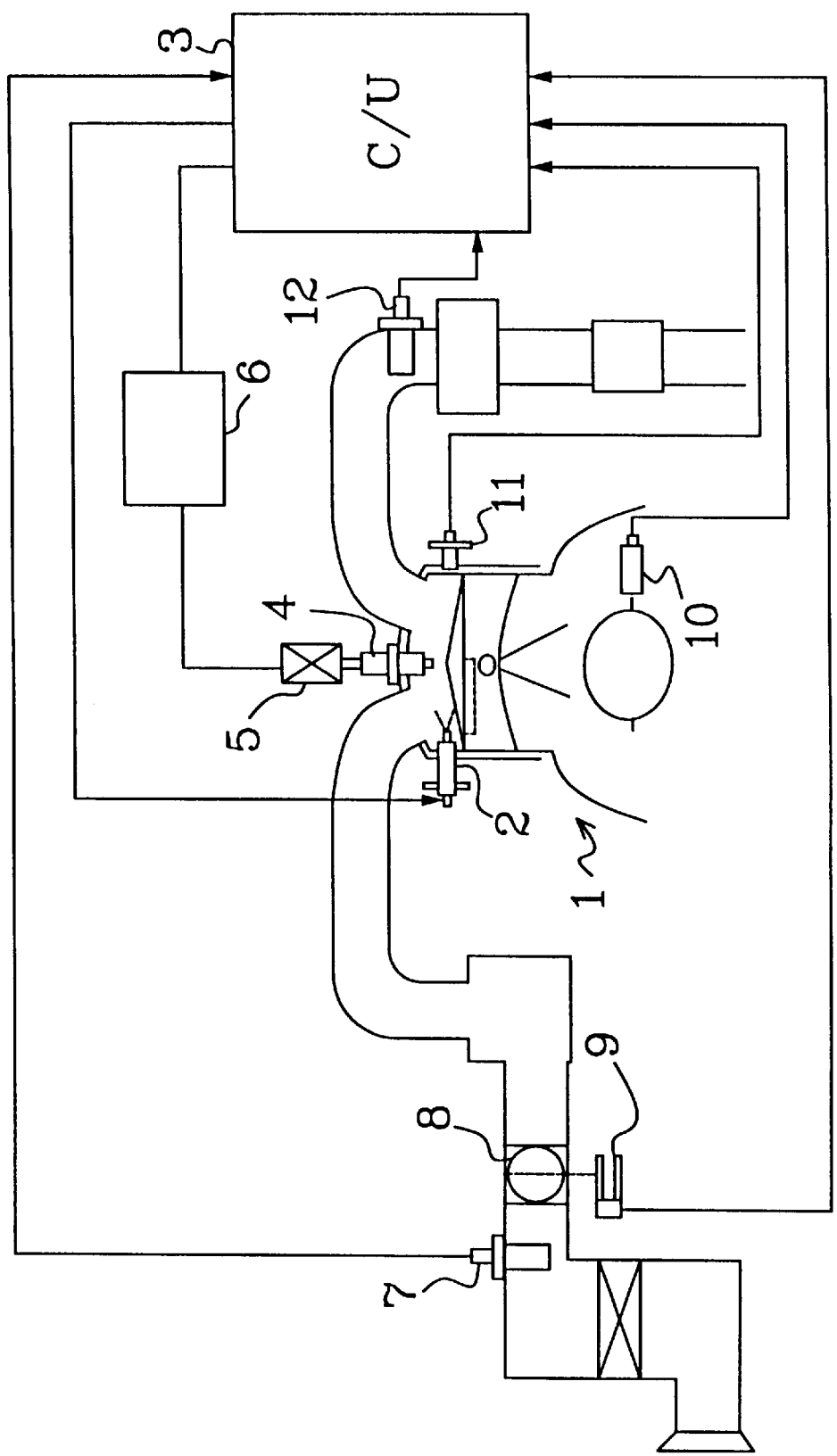
FIG. 1 is a system configuration of the engine according to an embodiment of the present invention.

The embodiments of the present invention will be explained hereinafter referring to the drawings.

FIG. 1 is a system configuration of the engine according to the present embodiment, and an engine 1 shown in FIG. 1 is a direct injection gasoline engine which has a fuel injection valve 2 for directly injecting fuel into the cylinder and an ignition plug 4 in each cylinder.

The fuel injection valve 2 on each cylinder is controlled by an injection pulse signal from a control unit 3 including a microcomputer. Further, to each ignition plug 4 is equipped an ignition coil 5. The power to the primary side of each ignition coil is turned on or off with a power transmission unit 6 in response to the ignition signal from the control unit 3, thereby controlling the ignition timing for each cylinder.

Detection signals from various sensors are input to the control unit 3 to control the fuel injection quantity, the fuel injection timing, and the ignition timing.

Various sensors include an airflow meter 7 for detecting the intake airflow, a throttle sensor 9 for detecting the opening degree of a throttle valve 8, a crank angle sensor 10 for detecting the crank angle, a water temperature sensor 11 for detecting the cooling water temperature, and an oxygen sensor 12 for detecting the average air-fuel ratio of the combustion airfuel mixture based on the oxygen concentration in the exhaust gas.

The control unit 3 includes a plurality of target equivalence ratio maps setting in advance the target equivalence ratio and the combustion mode corresponding to the target output torque and the engine rotation speed. The plurality of target equivalence ratio maps are switched to correspond to conditions such as the water temperature, the time after starting, the vehicle speed, the acceleration and the like for reference, and the control unit 3 judges the request on the combustion mode and the target equivalence ratio.

As for the combustion mode, an uniform charge combustion mode for performing uniform charge combustion by injecting fuel only in the intake stroke, a stratified charge combustion mode for performing stratified charge combustion by forming a concentrated air-fuel mixture to the area approximate to the ignition plug 4 by injecting fuel only in the compression stroke, and a double injection mode for performing the intake stroke injection and the compression stroke injection in one cycle when switching between the uniform charge combustion mode and the stratified charge combustion mode are set.

Further, in the double injection mode, the fuel quantity to be injected by the intake stroke and the fuel quantity to be injected by the compression stroke are determined by the share rate (division ratio) corresponding to the target equivalence ratio.

The control unit 3 which has a function of a mode switching device, upon determining the target equivalence ratio and the combustion mode by referring to the target equivalence ratio map, calculates the fuel injection quantity (injection pulse width) corresponding to the target equivalence ratio based on the intake air flow quantity, the engine rotation speed or the like, and at the same time determines the injection timing, when the injection timing has come, the injection pulse signal of the injection pulse width is output to the fuel injection valve 2.

Further, the control unit 3 determines the ignition timing by referring to a previously set ignition timing map, and at the same time determines the power supply time (power supply angle) corresponding to the battery voltage and the like. Then, an ignition signal is output to the power transmission unit 6 based on the ignition timing and the power supply time (power supply angle), thereby controlling the ignition timing of each ignition plug 4.

The injection timing is determined according to the fuel injection quantity and the engine rotation speed. The injection timing maps store the injection timing corresponding to both the fuel injection quantity and the engine rotation speed total of four injection timing maps for the stratified charge combustion mode, the uniform charge combustion mode, the intake stroke injection and the compression stroke injection of the double injection mode are stored in advance in the control unit 3 (injection timing map memory device).

Further, the ignition timing is also determined corresponding to the fuel injection quantity and the engine rotation speed. A total of three maps, for the uniform charge combustion mode, the stratified charge combustion mode and the double injection mode, are stored in the control unit 3 (ignition timing map memory device) as the ignition timing map.

As described above, by determining the injection timing and the ignition timing of the double injection mode by referring to a map that is different from the maps for the uniform charge combustion mode or the stratified charge combustion mode, the demand for the injection timing and the ignition timing during the double injection mode, which differs from the timing during the uniform charge combustion mode or the stratified charge combustion mode, can be responded to. Therefore, high combustion stability can be ensured during the double injection mode.

Next, the injection timing control and the ignition timing control will be explained in detail with reference to the flowcharts shown in FIGS. 2 through 4. Note that the flowcharts of FIGS. 2 through 4 only show the determination of the injection timing and the ignition timing for the double injection mode. The examples for the uniform charge combustion mode and the stratified charge combustion mode are not shown, because the ignition timing and the injection timing are determined by referring to the map for each of the mode based on the fuel injection quantity and the engine rotation speed at that time.

Figure 2:
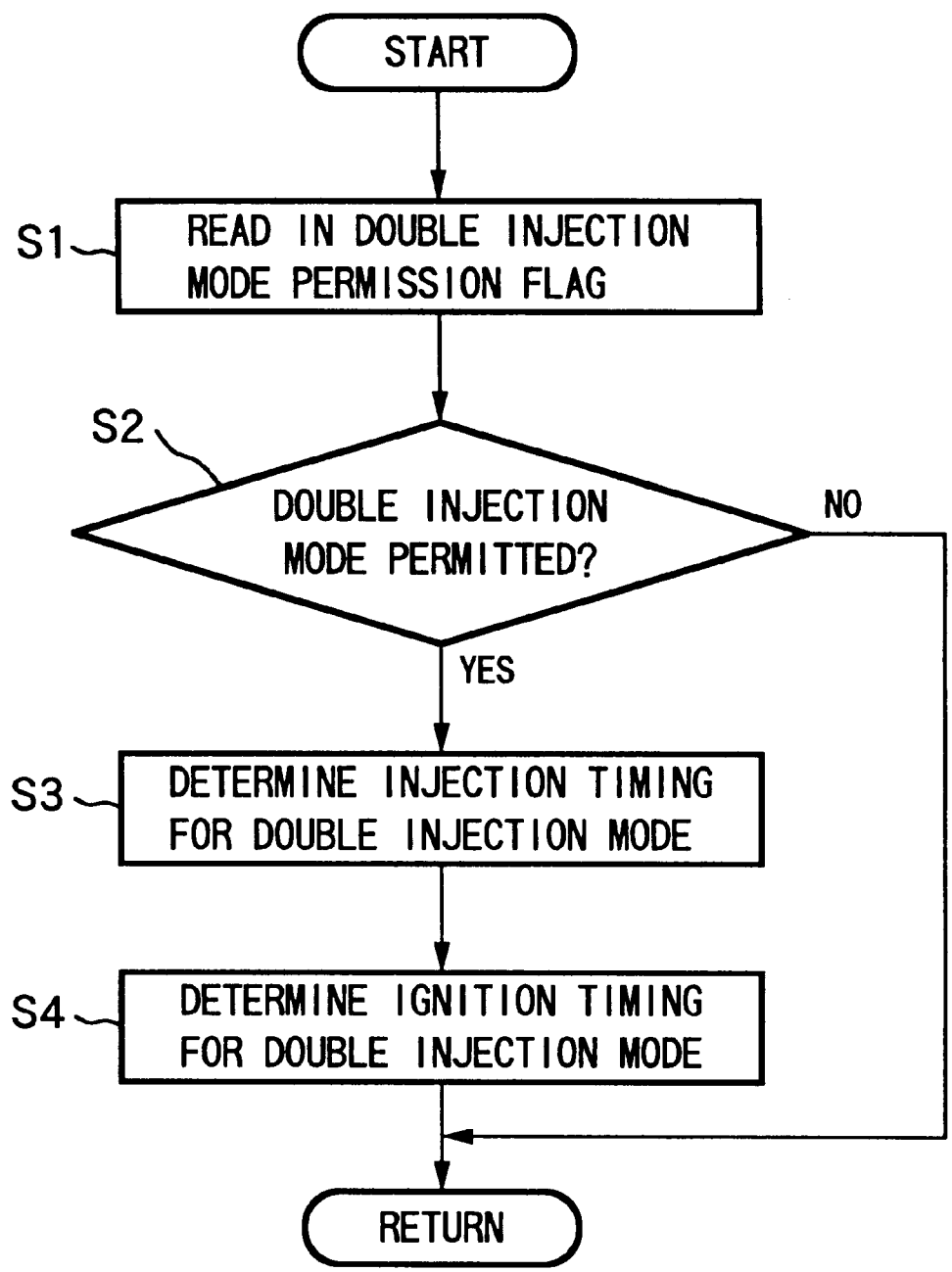
FIG. 2 is a flowchart showing the main routine for determining the injection timing and the ignition timing in the double injection mode.

The flowchart of FIG. 2 shows the main routine for the double injection mode. In step 1 (Shown as S1 in the drawing. Other following steps are shown similarly), a permission flag of the double injection mode is read in. Then in step 2, it is judged, based on the flag, whether the double injection mode should be executed.

When the double injection mode is not executed, that is, when the mode is either the uniform charge combustion mode or the stratified charge combustion mode, then the injection timing and the ignition timing are determined by referring to the injection timing map and the ignition timing map set for each of the combustion modes (injection timing search device, ignition timing search device).

On the other hand, when the double injection mode is executed, the process is advanced to step 3, where the injection timing for the double injection mode is determined, and in the following step 4, the ignition timing for the double injection mode is determined.

The determination on the injection timing (I/T) in step 3 (injection timing search device) is shown in detail in the flowchart of FIG. 3.

Referring to the flowchart of FIG. 3, in step 31, the engine rotation speed, the fuel injection quantity (the fuel injection quantity before the division), and the share rate (division ratio), which is calculated by dividing the fuel injection quantity for ignition by two times, the intake stroke injection and the compression stroke injection, are read in.

In step 32, the fuel injection quantity of the intake stroke injection is calculated based on the fuel injection quantity and the share rate.

Similarly, in step 33, the fuel injection quantity of the compression stroke injection is calculated based on the fuel injection quantity and the share rate.

In step 34, the map for the intake stroke injection of the double injection mode storing in advance the injection timing corresponding to the fuel injection quantity and the engine rotation speed is referred to, based on the fuel injection quantity and the engine rotation speed at that time during the intake stroke injection calculated at step 32, thereby determining the injection timing in the intake stroke injection of the double injection mode (injection timing search device).

Further, in step 35, the map for the compression stroke injection of the double injection mode storing in advance the injection timing corresponding to the fuel injection quantity and the engine rotation speed is referred to, based on the fuel injection quantity and the engine rotation speed at that time during the compression stroke injection calculated at step 33, thereby determining the injection timing in the compression stroke injection of the double injection mode (injection timing search device).

By determining the timing of the intake stroke injection and the timing of the compression stroke injection of the double injection mode individually according to each fuel injection quantity, the injection can be performed by the most accurate injection timing according to the change in the share rate between the intake stroke injection and the compression stroke injection.

On the other hand, the determination on the ignition timing ADV of step 4 (ignition timing search device) is explained in detail by the flowchart of FIG. 4.

In the flowchart of FIG. 4, the engine rotation speed and the fuel injection quantity (fuel injection quantity before the division) is read in.

In step 42, the ignition timing map for the dual injection mode storing in advance the ignition timing corresponding to the fuel injection quantity and the engine rotation speed is referred to, based on the engine rotation speed and the fuel injection quantity (fuel injection quantity before the division) which was read in at step 41, thereby determining the ignition timing of the double injection mode.

According to the embodiment explained above, as shown in FIG. 5, during the stratified charge combustion mode, the injection timing and the ignition timing are determined by reference to the map for the stratified charge combustion mode, and during the uniform charge combustion mode, the map for the uniform charge combustion mode is referred to in order to determine the injection timing and the ignition timing. Further, during the double injection mode performed at the switch time of the stratified charge combustion mode and the uniform charge combustion mode, the map for the double injection mode is referred to in order to determine the injection timing and the ignition timing. Two injection timing maps for the double injection mode are prepared, one for the intake stroke injection and one for the compression stroke injection, and each map is referred to based on the fuel injection quantity corresponding to each share rate (division ratio), and the injection timing is determined.

During the shift from the stratified charge combustion mode to the uniform charge combustion mode, the share rate (division ratio) is set so that the rate of the compression stroke injection is gradually decreased while the fuel injection quantity of the intake stroke injection is relatively increased, and during the shift from the uniform charge combustion mode to the stratified charge combustion mode, the share rate (division ratio) is set so that the rate of the intake stroke injection is gradually decreased while the fuel injection quantity of the compression stroke injection is relatively increased.

Further, in the above embodiment, different injection timings are set for both the intake stroke injection and the compression stroke injection during the double injection mode by referring to the timing map which differs from that of the uniform charge combustion mode or the stratified charge combustion mode. However, even if the injection timing of the intake stroke injection deviates from the optimum timing, it will not effect the combustion stability as when such deviation occurs at the compression stroke injection.

Therefore, as shown in the flowchart of FIG. 6, the construction may be such that the injection timing for the intake stroke injection of the double injection mode is determined by referring to the injection timing map for the uniform charge combustion mode which performs the same intake stroke injection, and the injection timing for the compression stroke injection of the double injection mode is determined by referring to the map set for the double injection mode.

In the flowchart of FIG. 6, in step 301, the engine rotation speed, the fuel injection quantity (fuel injection quantity before the division) and the share rate (division ratio) are read in.

Then, in step 302, the injection timing map set for the uniform charge combustion mode is referred to based on the engine rotation speed and the total quantity of fuel injected during the intake stroke injection and the compression stroke injection, or in other words, the fuel injection quantity before the division which was read in at step 301, and the injection timing for the intake stroke injection of the double injection mode is determined.

In the next step 303, the fuel injection quantity for the compression stroke injection is calculated based on the fuel injection quantity before the division and the share rate (division ratio).

Then, in step 304, the injection timing map set to adopt to the compression stroke injection of the double injection mode is referred to based on the engine rotation speed and the fuel quantity injected by the compression stroke which was calculated at step 303, thereby determining the injection timing.

As was explained above, by utilizing the same timing for the intake stroke injection of the double injection mode and the uniform charge combustion mode performing the same intake stroke injection, the number of the injection timing maps can be reduced, and the number of map adopting steps can be reduced. The system configuration can thereby be simplified.

We claim:

1. A control method for a direct injection gasoline engine having a fuel injection valve for directly injecting fuel into a cylinder, the method comprising:

performing a stratified charge combustion only by a compression stroke injection in a stratified charge combustion mode;

switching from said stratified charge combustion mode to a uniform charge combustion mode and, at said switching, temporarily performing a double injection of an intake stroke injection and a compression stroke injection in one cycle;

performing a uniform charge combustion only by an intake stroke injection in the uniform charge combustion mode;

providing injection timing map for said stratified charge combustion mode, an injection timing map for said uniform charge combustion mode, an injection timing map for the intake stroke injection of said double injection mode, and an injection timing map for the compression stroke injection of said double injection mode are individually equipped; and controlling each fuel injection by searching the injection timing from the corresponding map out of said plurality of injection timing maps.

2. A control method for a direct injection gasoline engine according to claim 1, wherein said injection timing maps store the injection timing corresponding to a fuel injection quantity and an engine rotation speed, and when searching the injection timing map in the double injection mode, the injection timing is searched from the injection timing map for said intake stroke injection based on the fuel quantity being injected in the intake stroke injection, and the injecting timing is also searched from the injection timing map for said compression stroke injection based on the fuel quantity being injected in the compression stroke.

3. A control method for a direct injection gasoline engine according to claim 1, further providing an ignition timing map for said stratified charge combustion mode, an ignition timing map for said uniform charge combustion mode; and controlling an ignition timing in each mode by searching the ignition timing from a corresponding map out of said ignition timing maps.

4. A control method for a direct injection gasoline engine according to claim 3, wherein said ignition timing maps store the ignition timing corresponding to a fuel injection quantity and an engine rotation speed, and in said double injection mode, the ignition timing is searched from the ignition timing map for said double injection mode based on the total quantity of fuel being injected by the intake stroke injection and the compression stroke injection.

5. A control method for a direct injection gasoline engine having a fuel injection valve for directly injecting fuel into a cylinder, the method comprising:

performing a stratified charge combustion only by a compression stroke injection in a stratified charge combustion mode;

switching from said stratified charge combustion mode to a uniform charge combustion mode and, at said switching, temporarily performing a double injection of an intake stroke injection and a compression stroke injection in one cycle;

performing a uniform charge combustion only by an intake stroke injection in the uniform charge combustion mode;

providing an injection timing map for said stratified charge combustion mode, an injection timing map for said uniform charge combustion mode, and an injection timing map for the compression stroke injection of said double injection mode;

searching the injection timing for the fuel injection corresponding to each of said injection timing maps from said injection timing maps; and searching the ignition timing for the intake stroke injection of said double injection mode from the injection timing map for said uniform charge combustion mode.

6. A control method for a direct injection gasoline engine according to claim 5, wherein said injection timing maps store the injection timing corresponding to a fuel injection quantity and an engine rotation speed, and when performing the intake stroke injection in the double injection mode, the injection timing is searched from the injection timing map for said uniform charge combustion mode based on the total quantity of fuel being injected in the intake stroke injection and the compression stroke injection, and, when performing the compression stroke injection in the double injection mode, the injection timing is searched from the injection timing map for said compression stroke injection based on the fuel quantity being injected in the compression stroke injection.

7. A control method for a direct injection gasoline engine according to claim 5, further providing an ignition timing map for said stratified charge combustion mode, an ignition timing map for said uniform charge combustion mode, and an ignition timing map for said double injection mode, wherein the ignition timing in each mode is controlled by searching the ignition timing from a corresponding map out of said ignition timing maps.

8. A control method for a direct injection gasoline engine according to claim 7, wherein said ignition timing maps store the injection timing corresponding to a fuel injection quantity and an engine rotation speed, and in said double injection mode, the ignition timing is searched from the ignition timing map for said double injection mode based on the total amount of fuel being injected by the intake stroke injection and the compression stroke injection.

9. A control apparatus for a direct injection gasoline engine comprising:

a fuel injection valve that directly injects fuel into a cylinder;

a mode switching element that switches the mode between a stratified charge combustion mode, which performs a stratified charge combustion only by a compression stroke injection, and a uniform combustion mode, which performs a uniform charge combustion only by an intake stroke injection, and, at a time of switching between said uniform charge combustion mode and said stratified charge combustion mode, a temporary double injection mode, which performs a double injection of an intake stroke injection and a compression stroke injection in one cycle, is executed;

an injection timing map memory that individually stores an injection timing map for said stratified charge combustion mode, an injection timing map for said uniform charge combustion mode, an injection timing map for the intake stroke injection in said double injection mode, and an injection timing map for the compression stroke injection in said double injection mode; and an injection timing search element that searches for the injection timing for each mode from a corresponding map out of said injection timing maps.

10. A control apparatus for a direct injection gasoline engine according to claim 9, wherein said injection timing map memory element stores the injection timing corresponding to a fuel injection quantity and an engine rotation speed, and wherein, during said double injection mode, said injection timing search element searches for the injection timing from said injection timing map for said intake stroke injection based on the fuel quantity being injected by the intake stroke injection and searches the injection timing from said injection timing map for said compression stroke injection based on the fuel quantity being injected by the compression stroke.

11. A control apparatus for a direct injection gasoline engine according to claim 9, further comprising:

an ignition timing map memory element that individually stores an ignition timing map for said stratified charge combustion mode, an ignition timing map for said uniform charge combustion mode, and an ignition timing map for said double injection timing map for said double injection mode; and an ignition timing search element that determines the ignition timing in each mode by searching for the ignition timing from a corresponding map out of said ignition timing maps.

12. A control apparatus for a direct injection gasoline engine according to claim 11, wherein said ignition timing map memory element stores the ignition timing corresponding to a fuel injection quantity and an engine rotation speed, and wherein, during said double injection mode, said ignition timing search element searches for the ignition timing from said timing map for said double injection mode based on the total amount of fuel being injected by the intake stroke and the compression stroke injection.

13. A control apparatus for a direct injection gasoline engine comprising:

a fuel injection valve that directly injects fuel into a cylinder;

a mode switching element that switches the mode between a stratified charge combustion mode, which performs a stratified charge combustion only by a compression stroke injection, and a uniform combustion mode, which performs a uniform charge combustion only by an intake stroke injection, and, at a time of switching between said uniform charge combustion mode and said stratified charge combustion mode, a temporary double injection mode, which performs a double injection of an intake stroke injection and a compression stroke injection in one cycle, is executed;

an injection timing map memory element that individually stores an injection timing map for said stratified charge combustion mode, an injection timing map for said uniform charge combustion mode, an injection timing map for the intake stroke injection in said double injection mode, and an injection timing map for the compression stroke injection in said double injection mode; and an injection timing search element that searches for the injection timing from a corresponding map out of said injection timing maps for the fuel injection corresponding to each of said injection timing maps, and, for the intake stroke injection of said double injection mode, for the injection timing from the injection timing map for said uniform charge combustion mode.

14. A control apparatus for a direct injection gasoline engine according to claim 13, wherein said injection map memory element stores the injection timing corresponding to a fuel injection quantity and an engine rotation speed, wherein, during the intake stroke injection of said double injection mode, said injection timing search element searches for the injection timing from the injection timing map for said uniform charge combustion mode, based on the total quantity of fuel being injected by the intake stroke injection and the compression stroke injection, and wherein, during the compression stroke injection of said double injection mode, searches the injection timing from the injection timing map for said compression stroke injection based on the fuel quantity being injected by the compression stroke.

15. A control apparatus for a direct injection gasoline engine according to claim 13, further comprising:

an ignition timing map memory element that individually stores storing an ignition timing map for said stratified charge combustion mode, an ignition timing map for said uniform charge combustion mode, and an ignition timing map for said double injection mode; and an ignition timing search element that determines the ignition timing in each mode by searching for the ignition timing from a corresponding map out of said ignition timing maps.

16. A control apparatus for a direct injection gasoline engine according to claim 15, wherein said ignition timing map memory element stores the ignition timing corresponding to a fuel injection quantity and an engine rotation speed, and wherein, during the double injection mode, said ignition timing search element searches for the ignition timing map for said double injection mode based on the total quantity of fuel being injected by the intake stroke injection and the compression stroke injection.

\* \* \* \* \*